(12) United States Patent
Lee et al.

(10) Patent No.: US 9,075,267 B2
(45) Date of Patent: Jul. 7, 2015

(54) DISPLAY PANEL

(75) Inventors: Hao-Chieh Lee, Taoyuan County (TW); Yi-Suei Liao, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 151 days.

(21) Appl. No.: 13/427,902

(22) Filed: Mar. 23, 2012

(65) Prior Publication Data

US 2013/0120328 A1   May 16, 2013

(30) Foreign Application Priority Data

Nov. 10, 2011 (TW) .............................. 100141055 A

(51) Int. Cl.
| | | |
|---|---|---|
| G06F 3/038 | (2013.01) | |
| G09G 5/00 | (2006.01) | |
| G02F 1/1343 | (2006.01) | |
| G02F 1/1339 | (2006.01) | |
| G02F 1/1345 | (2006.01) | |

(52) U.S. Cl.
 CPC ............ *G02F 1/1339* (2013.01); *G02F 1/1345* (2013.01); *G02F 2001/13398* (2013.01)

(58) Field of Classification Search
 USPC ............................. 349/139, 153; 345/87–104
 See application file for complete search history.

(56) References Cited

U.S. PATENT DOCUMENTS

| | | | |
|---|---|---|---|
| 7,583,350 B2* | 9/2009 | Chang et al. ................... | 349/153 |
| 7,701,135 B2 | 4/2010 | Lee et al. | |
| 8,334,962 B2 | 12/2012 | Chang et al. | |
| 2006/0139556 A1* | 6/2006 | Ahn et al. ....................... | 349/153 |
| 2007/0120152 A1 | 5/2007 | Chang et al. | |
| 2009/0290085 A1 | 11/2009 | Chang et al. | |
| 2010/0090995 A1* | 4/2010 | Chung et al. ................... | 345/205 |
| 2010/0118250 A1* | 5/2010 | Fujikawa ........................ | 349/139 |
| 2010/0123738 A1* | 5/2010 | Matsukawa ..................... | 345/690 |

FOREIGN PATENT DOCUMENTS

| | | |
|---|---|---|
| CN | 1975519 | 6/2007 |
| CN | 101571635 | 11/2009 |
| CN | 101697043 | 4/2010 |

OTHER PUBLICATIONS

"First Office Action of China Counterpart Application" issued on Oct. 21, 2013.
"Office Action of Taiwan Counterpart Application", issued on Mar. 31, 2014, p. 1-p. 5.

* cited by examiner

*Primary Examiner* — Aneeta Yodichkas
*Assistant Examiner* — Brent D Castiaux
(74) *Attorney, Agent, or Firm* — Jianq Chyun IP Office

(57) ABSTRACT

A liquid crystal display panel including a first substrate, an active device array, a gate driver on array (GOA), at least one signal transmission connection pad, a second substrate, an opposite electrode layer, conduction devices, and a display medium is provided. The active device array includes scan lines, data lines, and active devices. The GOA is electrically connected to the scan lines. The signal transmission connection pads are located respectively at a first side of the active device array and a second side of the active device array. The first side and the second side are corresponding to two opposite ends of the scan lines, respectively. The conduction devices and the display medium are disposed between the first substrate and the second substrate. The signal transmission connection pads are electrically connected to the opposite electrode layer through the conduction devices.

5 Claims, 3 Drawing Sheets

DISPLAY PANEL

CROSS-REFERENCE TO RELATED APPLICATION

This application claims the priority benefit of Taiwan application serial no. 100141055, filed on Nov. 10, 2011. The entirety of the above-mentioned patent application is hereby incorporated by reference herein and made a part of this specification.

BACKGROUND OF THE INVENTION

1. Field of the Invention

The present invention generally relates to a display panel, in particular, to a display panel having a gate driver on array (GOA).

2. Description of Related Art

Displays with various sizes, such as a television (TV), a computer screen, a notebook computer and a mobile phone, are developing rapidly. Taking the notebook computer as an example, consumers have an increasing demand for an aesthetic feeling of the appearance of the display apart from the demands for the displaying performance of the display, such as the resolution, contrast and viewing angle. Therefore, more and more manufacturers associated in the display field contribute to a slim border design, to make a display having light weight and thin volume with the same display quality, thereby satisfying the demands of the consumers. Among multiple flat-panel displays in the market, a thin film transistor liquid crystal display (TFT LCD) advantageous in high picture quality, good space utilization rate and low power consumption has already been widely used. The slim border design of the liquid crystal display is one of the study focuses of the manufacturers associated in this field.

A TFT LCD panel is mainly formed by an active device array substrate, an opposite substrate, and a liquid crystal layer located between the active device array substrate and the opposite substrate. The active device array substrate includes a substrate, a plurality of scan lines, a plurality of data lines, a plurality of pixel units, and a driver integrated circuit (IC). The substrate has a display area and a non-display area located on the periphery of the display area. The scan lines and the data lines are interlaced in the display area, and the pixel unites are connected to the scan lines and the data lines. The driver IC is located in the non-display area of the substrate.

The scan lines and the data lines may be electrically connected to the driver IC through peripheral wires in the non-display area. With an increased resolution, sufficient space needs to be provided on the periphery of the display area for the configuration of the layout of the numerous peripheral wires. Therefore, in order to achieve the slim border design, it is proposed to make an improvement on the design of the peripheral wires in the prior art. However, the current design cannot make all display panels have a slim border.

SUMMARY OF THE INVENTION

Accordingly, the present invention is directed to a display panel, which uses a GOA in combination with signal transmission connection pads to implement a slim border design.

The present invention provides a display panel, which includes a first substrate, an active device array, a GOA, at least one first signal transmission connection pad, at least one second signal transmission connection pad, a second substrate, an opposite electrode layer, conduction devices, and a display medium. The active device array, the GOA, the first signal transmission connection pad, and the second signal transmission connection pad are all disposed on the first substrate. The active device array includes a plurality of scan lines, a plurality of data lines, and a plurality of active devices. Each of the active devices is connected to a corresponding scan line and a corresponding data line. The GOA is electrically connected to the scan lines of the active device array. The first signal transmission connection pad is located at a first side of the active device array, the second signal transmission connection pad is located at a second side of the active device array, and the GOA is located between the active device array and the first signal transmission connection pad. The first side and the second side are respectively corresponding to two opposite ends in an extending direction of the scan lines. The opposite electrode layer is disposed on the second substrate, and the second substrate and the first substrate are opposite to each other in an up-and-down manner. The display medium and the conduction devices are disposed between the first substrate and the second substrate. The display medium is driven by the active device array. The conduction devices are respectively connected between the first signal transmission connection pad and the opposite electrode layer and between the second signal transmission connection pad and the opposite electrode layer, so as to electrically connect the first signal transmission connection pad and the second signal transmission connection pad to the opposite electrode layer, respectively.

In an embodiment of the present invention, the above display panel includes a sealant, disposed between the first substrate and the second substrate to seal the display medium within a set range of the sealant.

In an embodiment of the present invention, the above sealant covers the first signal transmission connection pad and the second signal transmission connection pad, and the conduction devices are distributed inside the sealant.

In an embodiment of the present invention, the above conduction device includes a metal ball or a conductive particle.

In an embodiment of the present invention, in the extending direction of the data lines, a distance between a third side of the active device array and a border of the first substrate is substantially smaller than or equal to a width of the conduction device, and the third side is connected between the first side and the second side.

In view of the above, the display panel provided by the present invention may use the GOA in combination with the signal transmission connection pads to decrease the width of at least one border on the periphery of the active device array.

In order to illustrate the features and advantages of the present invention more clearly, the present invention is further described in detail below by the embodiments with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
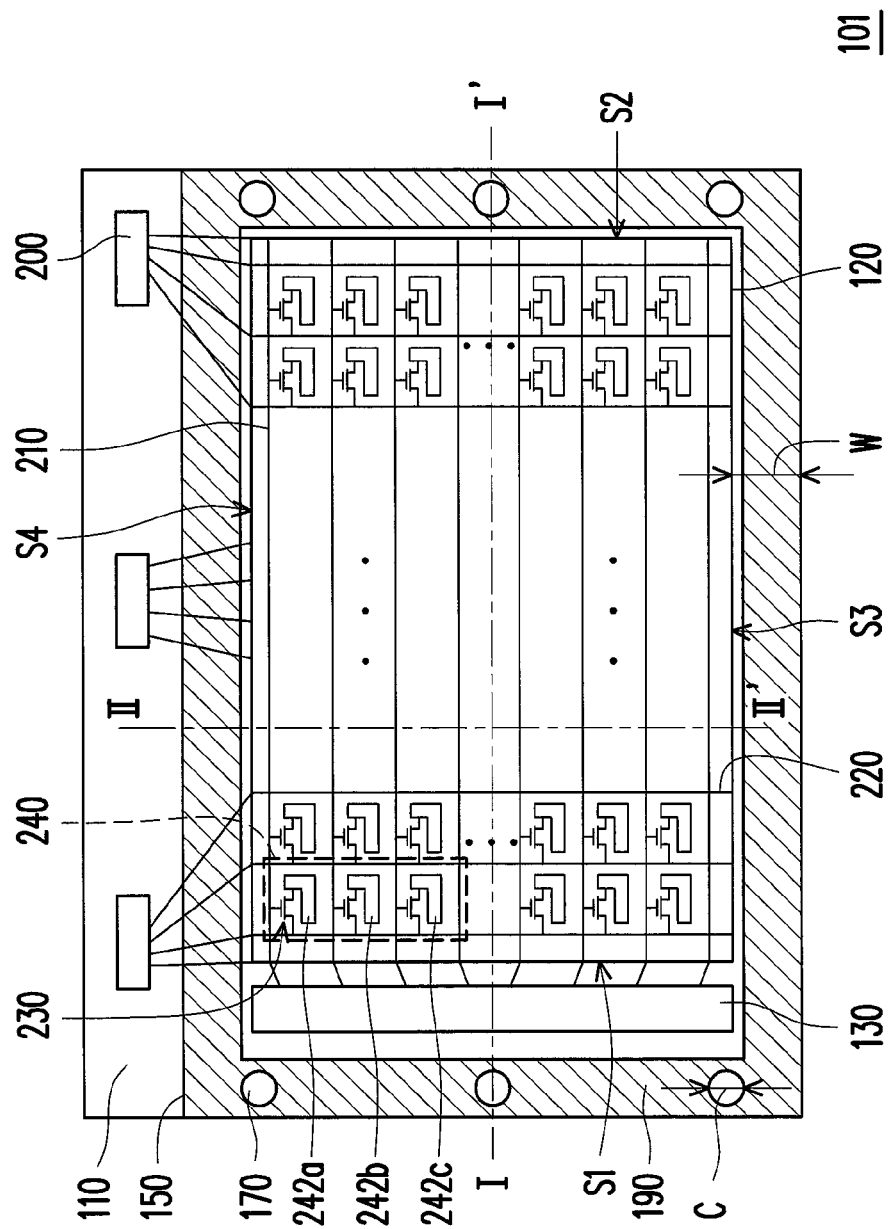
FIG. 1 is a schematic top view of a display panel according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

First Embodiment

Figure 2:
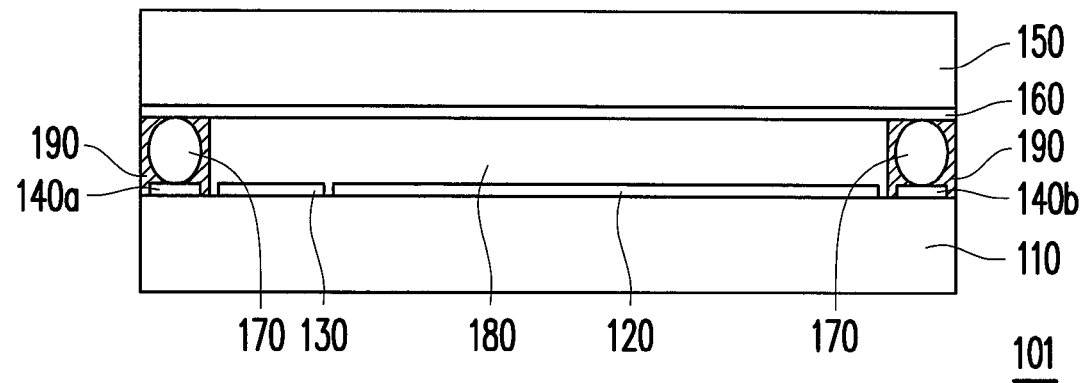
FIG. 2 is a schematic cross-sectional view of the display panel along a first section line I-I' according to the first embodiment of the present invention.
Figure 3:
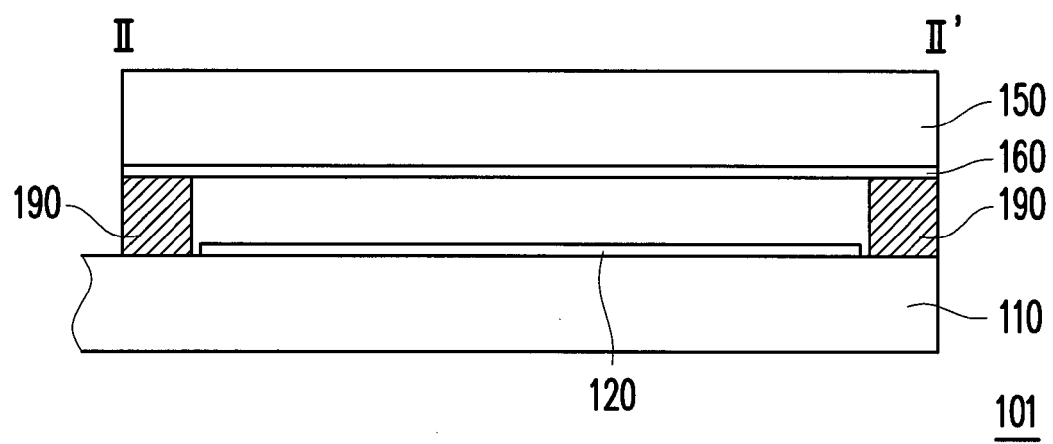
FIG. 3 is a schematic cross-sectional view of the display panel along a second section line II-II' according to the first embodiment of the present invention.

FIG. 1 to FIG. 3 are schematic views of a display panel according to an embodiment of the present invention. FIG. 1 is a schematic top view of a display panel according to the first embodiment of the present invention, FIG. 2 is a schematic cross-sectional view of FIG. 1 along a first section line I-I', and FIG. 3 is a schematic cross-sectional view of FIG. 1 along a second section line II-II'. Referring to FIG. 1 and FIG. 2 for an overall structure, a display panel 101 includes a first substrate 110, an active device array 120, a GOA 130, a plurality of first signal transmission connection pads 140a, a plurality of second signal transmission connection pads 140b, a second substrate 150, an opposite electrode layer 160, a plurality of conduction devices 170, a display medium 180, and a sealant 190. The devices disposed on the first substrate 110 include the active device array 120, the GOA 130, the first signal transmission connection pad 140a, and the second signal transmission connection pad 140b. It is noted that the drawing of FIG. 2 merely shows one first signal transmission connection pad 140a and one second signal transmission connection pad 140b, but the quantities of first signal transmission connection pad 140a and the second signal transmission connection pad 140b are substantially more than one.

Referring to FIG. 1 and FIG. 2 for relative positions between the active device array 120 and the adjacent devices, the GOA 130 is located between the active device array 120 and the first signal transmission connection pad 140a and is electrically connected to the active device array 120, the first signal transmission connection pad 140a is located at a first side S1 of the active device array 120, and the second signal transmission connection pad 140b is located at a second side S2 of the active device array 120.

The second substrate 150 and the first substrate 110 are opposite to each other in an up-and-down manner. The opposite electrode layer 160 is disposed on the second substrate 150. The display medium 180, the conduction devices 170, and the sealant 190 are all disposed between the first substrate 110 and the second substrate 150. The display medium 180 is sealed within a set range of the sealant 190. In this embodiment, the sealant 190 covers the first signal transmission connection pad 140a and the second signal transmission connection pad 140b. The conduction devices 170 are distributed inside the sealant 190, and the conduction device 170 may be, for example, a metal ball in the present embodiment.

The second substrate 150 is, for example, a color filter substrate, and the display medium 180 is, for example, a liquid crystal layer, an electrophoretic displaying material, or other displaying materials. That is, the second substrate 150 may be disposed with a color filter layer to implement colorful display function. Depending on the selection of the display medium 180, the display panel 101 may be, for example, a liquid crystal display panel, an electrophoretic display panel, or other display panels.

Specifically, referring to FIG. 1, the active device array 120 includes scan lines 210, data lines 220, and active devices 230. Each of the active devices 230 is connected to a corresponding scan line 210 and a corresponding data line 220. The scan lines 210 and the data lines 220 are interlaced with each other, and define pixel units 240 on the substrate 120. In this embodiment, the GOA 130 is electrically connected to the scan lines 210 to control whether the scan lines 210 are enabled or not. Each of the pixel units 240 may be disposed with pixel electrodes 242a, 242b and 242c which are respectively connected to a corresponding active device 230. The three pixel electrodes 242a, 242b and 242c in the same pixel unit 240 may respectively be corresponding to, for example, a red, a green, and a blue filter layer (not shown) to present different colors. Definitely, the present invention is not limited thereto. The three pixel electrodes 242a, 242b and 242c of each of the pixel units 240 may be selectively corresponding to a color filter layer with the same color and may have the same or different display voltages, or each of the pixel units 240 may be set according to an actual requirement.

Further referring to FIG. 1 and FIG. 3, the second section line II-II' may be parallel to the data lines 220. In view of the cross-section along the second section line II-II', no conduction device 170 is disposed outside the active device array 120. Therefore, in an extending direction of the data lines 220, a distance w between a third side S3 of the active device array 120 and a border of the first substrate 110 can be substantially smaller than or equal to a width C of the conduction device 170. The first side S1 and the second side S2 defined in this embodiment of the present invention are respectively corresponding to two opposite ends in the extending direction of the scan lines 210, and the third side S3 is connected between the first side S1 and the second side S2. The display panel 101 may further include source driver ICs 200 to transmit corresponding signals to the data lines 220. The source driver ICs 200 are located at a fourth side S4 of the active device array 120. The third side S3 and the fourth side S4 defined in this embodiment are respectively corresponding to two opposite ends of the data lines 220.

Referring to FIG. 1 to FIG. 3, the conduction devices 170 in this embodiment are substantially merely located adjacent to the first side S1 and the second side S2 of the active device array 120, and no conduction device 170 is disposed on the region located between the third side S3 of the active device array 120 and the border of the display panel 101 as well as the region between the fourth side S4 of the active device array 120 and the border of the display panel 101. Therefore, the display panel 101 at least has a slim border design corresponding to the third side S3 of the active device array 120. The width of the slim border (i.e., the distance w) may substantially be smaller than or equal to the width C of the conduction device 170.

In addition, referring to FIG. 1, in the display panel 101 provided in this embodiment, the sealant 190 covers the first signal transmission connection pad 140a and the second signal transmission connection pad 140b, and the conduction devices 170 are distributed inside the sealant 190. Meanwhile, the conduction device 170, for example, a metal ball, has one side in contact with the opposite electrode layer 160 and the other side in contact with the first signal transmission connection pad 140a or the second signal transmission connection pad 140b. In this case, a common voltage transmitted in the first signal transmission connection pad 140a and the second signal transmission connection pad 140b may be input into the opposite electrode layer 160 through the conduction device 170.

In an embodiment, in order to maintain the display voltage of each pixel electrode 242a, 242b and 242c, the active device array 120 may further include multiple capacitor electrode lines (not shown), which form, together with the pixel electrodes 242a, 242b and 242c, a storage capacitor. The capacitor electrode lines may have a voltage equal to or not equal to the common voltage transmitted in the first signal transmission connection pad 140a. When the voltage in the capacitor electrode lines is not the same as the common voltage transmitted in the first signal transmission connection pad 140a, an electrical conduction between the conduction device 170 and the capacitor electrode lines must be avoided. Therefore, in this embodiment, the first signal transmission connection pad 140a is located at a side of the GOA 130 far away from the active device array 120 may prevent a short circuit between the conduction device 170 and the capacitor electrode line from affecting the driving of the pixel units 240. Generally speaking, the design of this embodiment, apart from at least having a slim border at the third side S3 of the active device array 120, may further enable the display panel 101 to drive the opposite electrode layer 160 in different ways (for example, making the opposite electrode layer and the capacitor electrode line respectively have different voltages) so as to achieve a required displaying effect.

Second Embodiment

Figure 4:
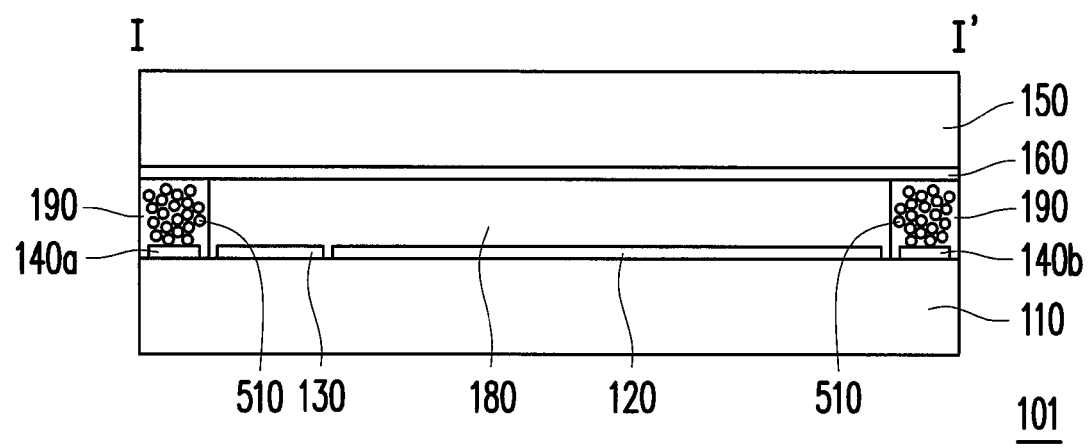
FIG. 4 is a schematic cross-sectional view of the display panel according to a second embodiment of the present invention and the cross-sectional view is taken corresponding to the first section line I-I' depicted in FIG. 1.

In the first embodiment, the conduction device 170 is a metal ball, and in the second embodiment, the conduction devices may be conductive particles 510, as shown in FIG. 4. Specifically, the structure of the second embodiment is similar to that of the first embodiment. Apart from the difference in the design of the conduction device, the other members in the second embodiment are the same as those in the first embodiment with reference to FIG. 1 and FIG. 3, which are not described in detail herein. The conductive particles 510 may be distributed in the sealant 190 to provide a conduction effect, so as to electrically connect the first signal transmission connection pad 140a and the second signal transmission connection pad 140b to the opposite electrode layer 160. It should be noted that, the conduction devices designed in the above two embodiments are merely examples for description. In other embodiments, the conduction device may be any device capable of electrically connecting the first signal transmission connection pad 140a and the second signal transmission connection pad 140b to the opposite electrode layer 160.

Based on the above, in the display panel provided by the present invention, no conduction device is needed between the third side of the active device array and the border of the first substrate in the extending direction of the data lines, so that the corresponding border is narrowed. In addition, the first signal transmission connection pad is located at the side of the GOA far away from the active device array, so as to prevent a short circuit between the conduction device and the capacitor electrode line in the active device array from affecting the driving of the display panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A display panel, comprising:
   a first substrate;
   an active device array, disposed on the first substrate, and comprising a plurality of scan lines, a plurality of data lines, and a plurality of active devices, wherein each of the active devices is connected to a corresponding scan line and a corresponding data line;
   a gate driver on array (GOA), disposed on the first substrate, and electrically connected to the scan lines of the active device array;
   at least one first signal transmission connection pad, disposed on the first substrate, and located at a first side of the active device array, wherein the GOA is located between the active device array and the first signal transmission connection pad;
   at least one second signal transmission connection pad, disposed on the first substrate, and located at a second side of the active device array, wherein the first side and the second side are respectively corresponding to two opposite ends in an extending direction of the scan lines, wherein the first signal transmission connection pad and the second signal transmission connection pad are common electrode pads;
   a second substrate, disposed opposite to the first substrate;
   an opposite electrode layer, disposed on the second substrate;
   a plurality of conduction devices, disposed between the first substrate and the second substrate, and respectively connected between the at least one first signal transmission connection pad and the opposite electrode layer and between the at least one second signal transmission connection pad and the opposite electrode layer, so as to electrically connect the at least one first signal transmission connection pad and the at least one second signal transmission connection pad to the opposite electrode layer, respectively, wherein the conduction devices are not located on a third and fourth side of the active device array, and the fourth side is opposite to the third side; and
   a display medium, disposed between the first substrate and the second substrate, and driven by the active device array.

2. The display panel according to claim 1, further comprising a sealant, disposed between the first substrate and the second substrate to seal the display medium within a set range of the sealant.

3. The display panel according to claim 2, wherein the sealant covers the at least one first signal transmission connection pad and the at least one second signal transmission connection pad, and the conduction devices are distributed inside the sealant.

4. The display panel according to claim 3, wherein each of the conduction devices comprises a metal ball or a conductive particle.

5. The display panel according to claim 1, wherein in the extending direction of the data lines, a distance between the third side of the active device array and a border of the first substrate is substantially smaller than or equal to a width of the conduction device, and the third side is connected between the first side and the second side.

* * * * *